(12) United States Patent
Fukuda (10) Patent No.: US 9,709,289 B2
(45) Date of Patent: Jul. 18, 2017

(54) CONTROL UNIT FOR AIR CONDITIONER

(71) Applicant: DENSO CORPORATION, Kariya, Aichi-pref. (JP)

(72) Inventor: Takayuki Fukuda, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 421 days.

(21) Appl. No.: 14/403,544

(22) PCT Filed: Apr. 1, 2013

(86) PCT No.: PCT/JP2013/002241
§ 371 (c)(1),
(2) Date: Nov. 24, 2014

(87) PCT Pub. No.: WO2013/179546
PCT Pub. Date: May 12, 2013

(65) Prior Publication Data
US 2015/0134121 A1 May 14, 2015

(30) Foreign Application Priority Data

May 31, 2012 (JP) .................................. 2012-124415

(51) Int. Cl.
*G05B 15/02* (2006.01)
*F24F 11/00* (2006.01)
(Continued)

(52) U.S. Cl.
CPC ...... *F24F 11/0009* (2013.01); *B60H 1/00428* (2013.01); *B60H 1/00857* (2013.01);
(Continued)

(58) Field of Classification Search
CPC .............................. G05B 15/02; F24F 11/0009
(Continued)

(56) References Cited

U.S. PATENT DOCUMENTS 6,242,875 B1 * 6/2001 Kusaka ................... H02P 6/085
318/400.07
2004/0245954 A1 12/2004 Moench et al.
(Continued)

FOREIGN PATENT DOCUMENTS

JP S62277090 A 12/1987
JP H05317138 A 12/1993
(Continued)

OTHER PUBLICATIONS

International Search Report and Written Opinion (in Japanese with English Translation) for PCT/JP2013/002241, mailed May 21, 2013; ISA/JP.

*Primary Examiner* — David S Luo
(74) *Attorney, Agent, or Firm* — Harness, Dickey & Pierce, P.L.C.

(57) ABSTRACT

A control unit controls a first DC motor and a second DC motor by detecting a rotational position thereof and includes first control means and second control means. The first control means performs a detection of the origin position pattern by controlling each DC motor to rotate toward one side within a detectable range. In case where the rotational position reaches one end of the detectable range, the second control means performs a detection of the origin position pattern by controlling the DC motor to rotate oppositely from the one side when the other DC motor is stopping, and performs a detection of the origin position pattern by controlling the DC motor to rotate oppositely from the one side after the rotational position of the other DC motor reaches the one end of the detectable range when the other DC motor is rotating.

6 Claims, 7 Drawing Sheets

(51) Int. Cl.
*H02P 7/29* (2016.01)
*B60H 1/00* (2006.01)
*H02P 7/03* (2016.01)

(52) U.S. Cl.
CPC ............... *G05B 15/02* (2013.01); *H02P 7/04* (2016.02); *H02P 7/29* (2013.01)

(58) Field of Classification Search
USPC .................................................. 318/567, 560
See application file for complete search history.

(56) References Cited

U.S. PATENT DOCUMENTS

| | | |
|---|---|---|
| 2005/0012480 A1 | 1/2005 | Takeuchi et al. |
| 2008/0238347 A1 | 10/2008 | Akiyama et al. |

FOREIGN PATENT DOCUMENTS

| | | | |
|---|---|---|---|
| JP | H08289595 A | 11/1996 | |
| JP | 2001174893 A | 6/2001 | |
| JP | 2003153586 A | 5/2003 | |
| JP | 2004090792 A | 3/2004 | |
| JP | 2005039958 A | 2/2005 | |
| JP | 2005245058 A | 9/2005 | |
| JP | 2006506262 A | 2/2006 | |
| JP | 2008253111 A | 10/2008 | |
| JP | 2010026390 A | 2/2010 | |
| JP | 2012121517 A | 6/2012 | |
| JP | 2013095313 A | 5/2013 | |
| JP | 2013095321 A | 5/2013 | |
| WO | WO-2013065286 A1 | 5/2013 | |

* cited by examiner

CONTROL UNIT FOR AIR CONDITIONER

CROSS-REFERENCE TO RELATED APPLICATIONS

This application is a U.S. National Phase Application under 35 U.S.C. 371 of International Application No. PCT/JP2013/002241 filed on Apr. 1, 2013 and published in Japanese as WO 2013/179546 on Dec. 5, 2013. This application is based on and claims the benefit of priority from Japanese Patent Application No. 2012-124415, filed on May 31, 2012. The entire disclosures of all of the above applications are incorporated herein by reference.

TECHNICAL FIELD

The present disclosure relates to a control unit for an air conditioner.

BACKGROUND ART

A control unit for an air conditioner employed in a vehicle or the like controls driving of an air outlet switching door by using a DC motor in order to control opening and closing of the air outlet. When opening and closing of the air outlet switching door is controlled, in order to set a degree of opening and closing precisely, an origin position of the DC motor is detected first and then the opening and closing is controlled in reference to the origin position. A technique used to this end is as follows. That is, an origin position pattern is detected, for example, by rotating the DC motor in a predetermined direction within a rotatable range of the DC motor or the air outlet switching door. In a case where a rotational position of the DC motor reaches an end of an operable range without detecting the origin position pattern, the origin position pattern is detected again by inverting the rotational direction.

Incidentally, as a method of controlling a plurality of DC motors in the air conditioner described as above, for example, two DC motors are driven by three half-bridge circuits. A configuration in this case is to control energization by connecting terminals of the two DC motors at one end to a common half-bridge circuit and connecting terminals at the other end to different half-bridge circuits.

According to this configuration, driving of two DC motors connected to three half-bridge circuits cannot be controlled in a completely independent manner. In a case where one DC motor is driven to rotate while the other motor is also driven, the one DC motor is not allowed to change the rotational direction and it is necessary to wait for the driving of the other DC motor to stop. In this case, one of the DC motors whichever is responsible for operations more readily recognizable by a user is operated preferentially so that the user does not feel uncomfortable.

However, when the configuration as above is adopted, of the origin position pattern detection times by the two DC motors, the longer time is dominant in an operation to detect the origin position pattern described above. Hence, a contribution to shortening of the detection time depends on whether this time can be shortened or not. However, in the opening and closing control of the doors of the air conditioner, a priority is assigned to the detection operation by one of the two DC motors connected to the three half-bridge circuits whichever is to be operated preferentially. Hence, a detection time of the DC motor on a non-priority side requires a further longer time in some cases.

PRIOR ART DOCUMENT

Patent Document

Patent Document 1: JP 2005-39958A (corresponding to US 2005/0012480A1)

SUMMARY OF INVENTION

The present disclosure has an object to provide a control unit for an air conditioner configured to be capable of minimizing a maximum time required for a detection operation of an origin position pattern when driving of two DC motors is controlled by three half-bridge circuits.

According to a first aspect of the present disclosure, a control unit for an air conditioner that has first and second doors includes: a first DC motor connected between first and second half-bridge circuits to drive the first door; and a second DC motor connected between the second and third half-bridge circuits to drive the second door. Each of the first and second DC motors has angle patterns and an origin position pattern to detect a rotational position thereof. A controller controls driving of the first and second DC motors by detecting the rotational position thereof from the angle patterns in reference to the origin position pattern.

As a detection operation of the origin position pattern of each of the first and second DC motors, the controller performs a detection of the origin position pattern by controlling to rotate toward one side within a detectable range and to stop upon detection of the origin position pattern. When the rotational position reaches one end of the detectable range without detecting the origin position pattern, the controller performs a detection of the origin position pattern by controlling the DC motor to rotate oppositely from the one side while the other DC motor is stopping, and while the other DC motor is rotating, the controller performs a detection of the origin position pattern by controlling the DC motor to rotate oppositely from the one side after the rotational position of the other DC motor reaches the one end of the detectable range.

Owing to the configuration as above, even when it is set by a drive control method of the first and second DC motors in such a manner that one of the first and second DC motors is operated preferentially in an air conditioning control operation, neither DC motor is operated preferentially in a detection operation of the origin position pattern. Hence, either DC motor waits until the other DC motor taking the longer movement time stops or the rotational position thereof reaches the end before the rotational direction is changed. Consequently, for example, even when a detection of the origin position pattern ends in failure and the DC motor is stopped after the detection operation is performed the predetermined number of times, the detection operation can be performed efficiently by minimizing a maximum required time.

Further, according to a second aspect of the present disclosure, a drive device for an air conditioner includes: first, second, and third half-bridge circuits, each of which having a pair of switching elements; a first DC motor connected between the first and second half-bridge circuits to drive a first door of the air conditioner; a second DC motor connected between the second and third half-bridge circuits to drive a second door of the air conditioner; and angle patterns and an origin position pattern provided to each of the first and second DC motors to detect a rotational position thereof, and a control unit used for the drive device for an air conditioner controls driving of the first and second DC motors by detecting a rotational position of each DC motor from the angle patterns in reference to the origin position pattern. The control unit includes: first control means that detects the origin position pattern by controlling each DC motor to rotate toward one side within a detectable range and to stop upon detection of the origin position pattern; and second control means, in case where the rotational position reaches one end of the detectable range, that perform a detection of the origin position pattern by controlling the DC motor to rotate oppositely from the one side when the other DC motor is stopping, and that performs a detection of the origin position pattern by controlling the DC motor to rotate oppositely from the one side after the rotational position of the other DC motor reaches the one end of the detectable range when the other DC motor is rotating.

BRIEF DESCRIPTION OF DRAWINGS

The above and other objects, configurations, and advantages of the present disclosure will become more apparent from the following detailed description taken in conjunction with the accompanying drawings.

DESCRIPTION OF EMBODIMENTS

First Embodiment

Hereinafter, a first embodiment in which the present disclosure is applied to a vehicle air conditioner will be described with reference to FIG. 1 through FIG. 4.

Figure 1:
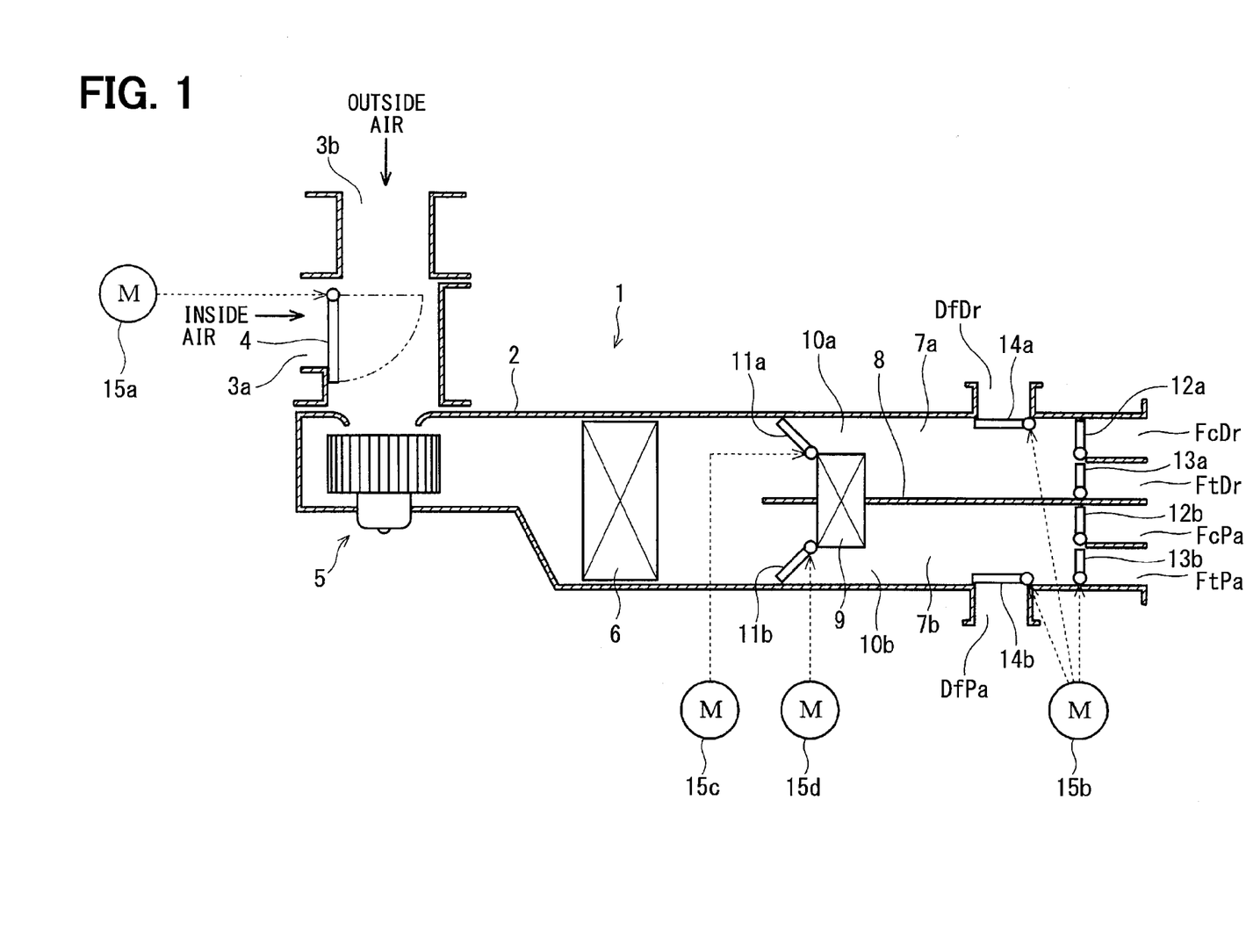
FIG. 1 is a view schematically showing a configuration of a duct of an air conditioner having a control unit according to a first embodiment.

FIG. 1 schematically shows an indoor air conditioning unit 1 forming an air conditioner and the indoor air conditioning unit 1 includes a duct 2. The duct 2 is provided with an indoor air inlet 3a and an outdoor air inlet 3b as well as an indoor and outdoor air switching door 4 that selectively opens and closes either the inlet 3a or 3b. In an air flowing direction within the duct 2, a portion through which air is let in, that is, the indoor air inlet 3a and the outdoor air inlet 3b, is defined as upstream and an air ejection side is defined as downstream.

A centrifugal air blower 5 is provided inside the duct 2 near downstream of the indoor air inlet 3a and the outdoor air inlet 3b and ventilates air from upstream to downstream. An evaporator 6 forming a refrigeration cycle is provided downstream of the centrifugal air blower 5 to cool flowing air. A partition plate 8 dividing an interior of the duct 2 to a driver-seat passage 7a and a passenger-seat passage 7b is provided downstream of the evaporator 6. A heater core 9 that exchanges heat using a cooling water of an engine as a heat source is provided downstream of the evaporator 6 in such a manner so as to stride across both of the driver-seat passage 7a and the passenger-seat passage 7b. The heater core 9 heats cold air from the evaporator 6 by making use of a temperature of the cooling water heated by the engine.

The driver-seat passage 7a and the passenger-seat passage 7b are provided, respectively, with bypass passages 10a and 10b allowing air to flow by bypassing the heater core 9. Also, the driver-seat passage 7a and the passenger-seat passage 7b are provided, respectively, with air mixing doors 11a and 11b to adjust a mixing ratio of air flowing through the heater core 9 and air flowing down the bypass passages 10a and 10b.

The air mixing door 11a adjusts a ratio of a volume of air flowing through the heater core 9 and a volume of air flowing down the bypass passage 10a for cold air flowing from the evaporator 6 to the driver-seat passage 7a by adjusting an opening degree. Consequently, hot air heated by flowing through the heater core 9 and cold air flowing down the bypass passage 10a are mixed on the downstream side and form conditioned air at a desired temperature. Likewise, the air mixing door 11b adjusts the opening degree to condition cold air flowing down the passenger-seat passage 7b to conditioned air at a desired temperature.

A driver-seat face air outlet FcDr, a driver-seat foot air outlet FtDr, and a driver-seat defroster air outlet Df Dr to eject the conditioned air are provided on the downstream side in the driver-seat passage 7a of the duct 2. A passenger-seat face air outlet FcPa, a passenger-seat foot air outlet FtPa, and a passenger-seat defroster air outlet DfPa to eject the conditioned air are provided on the downstream side in the passenger-seat passage 7b of the duct 2.

From the driver-seat face air outlet FcDr, the conditioned air from the driver-seat passage 7a is ejected toward an upper body of a driver in the driver seat. Likewise, from the driver-seat foot air outlet FtDr, the conditioned air is ejected toward a lower body of the driver. From the driver-seat defroster air outlet Df Dr, the conditioned air is ejected onto an inner surface of a windshield on the driver seat side. From the passenger-seat face air outlet FcPa, the conditioned air from the passenger-seat passage 7b is ejected toward an upper body of a passenger in the passenger seat. From the passenger-seat foot air outlet FtPa, the conditioned air is ejected toward a lower body of the passenger. From the passenger-seat defroster air outlet DfPa, the conditioned air is ejected onto an inner surface of a windshield on the passenger seat side.

Also, the duct 2 is provided with air outlet switching doors 12a, 13a, 14a, 12b, 13b, and 14b corresponding to the air outlets FcDr, FtDr, DfDr, FcPa, FtPa, and DfPa, respectively.

The indoor and outdoor air switching door 4 described above is connected to a DC motor 15a via a link mechanism and switches opening and closing of the indoor air inlet 3a and the outdoor air inlet 3b by rotational driving of the DC motor 15a. The air outlet switching doors 12a, 13a, 14a, 12b, 13b, and 14b are connected to a DC motor 15b via a link mechanism and drive the corresponding air outlets FcDr, FtDr, DfDr, FcPa, FtPa, and DfPa to open and close independently by rotational driving of the DC motor 15b. The air mixing doors 11a and 11b are connected to DC motors 15c and 15d, respectively, via link mechanisms and adjust a degree of opening by driving of the DC motors 15c and 15d.

Of the configuration described above, operations in the opening and closing control of the respective air outlets FcDr, FtDr, DfDr, FcPa, FtPa, and DfPa by the DC motor 15b are as follows. A rotational force of a rotation shaft of the DC motor 15b is transmitted to the air outlet switching doors 12a, 13a, 14a, 12b, 13b, and 14b via the link mechanism. Upon transmission of the rotational force, the air outlet switching doors 12a, 13a, 14a, 12b, 13b, and 14b are actuated and one air outlet mode among a face mode, a bi-level mode, a foot mode, a foot/defroster mode, and a defroster mode is performed.

The DC motor 15b and the link mechanism are configured in such a manner that the air outlet mode is sequentially switched in order of (i) the face mode, (ii) the bi-level mode, (iii) the foot mode, (iv) the foot/defroster mode, and (v) the defroster mode when the rotation shaft of the DC motor 15b rotates in one direction. The DC motor 15 and the link mechanism are also configured in such a manner that the air outlet mode is switched in reverse order to the order specified above when the DC motor 15b rotates in the other direction.

Of the respective modes specified above, the face air outlets FcDr and FcPa are opened in the face mode (i) and the bi-level mode (ii), the foot air outlets FtDr and FtPa are opened in the bi-level mode (ii), the foot mode (iii), and the foot and defroster mode (iv), and the defroster air outlets DfDr and DfPa are opened in the foot and defroster mode (iv) and the defroster mode (v), while the other air outlets are closed.

Figure 2:
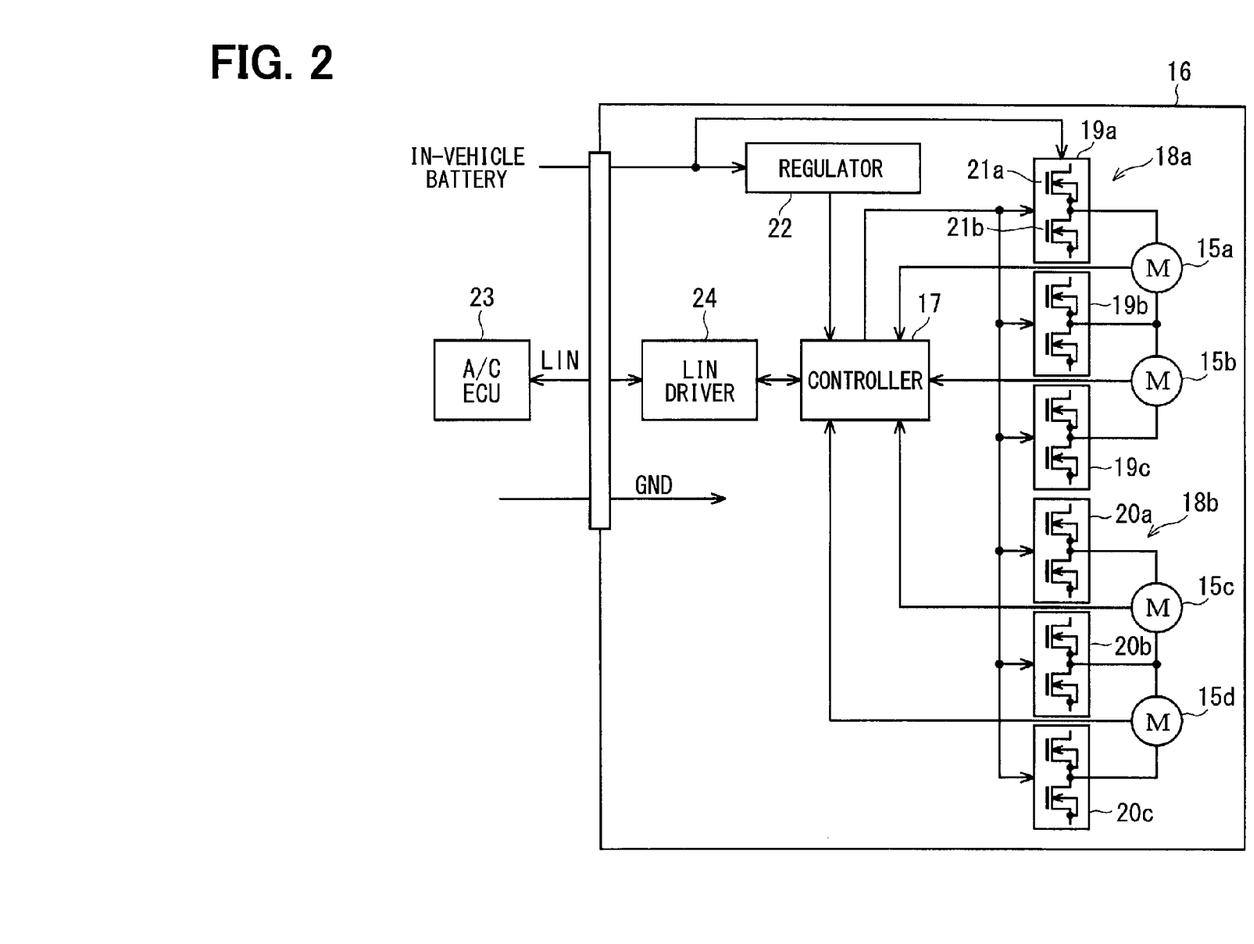
FIG. 2 is a view showing an electrical configuration of the control unit.

The DC motor 15a-15d is driven and controlled by a motor drive circuit 16 shown in FIG. 2. The motor drive circuit 16 operates as a control unit for an air conditioner and includes a control portion 17 serving as controller as main component. The control portion 17 is chiefly formed of a micro-computer including a CPU, a RAM, a ROM, and various interface circuits. The DC motors 15a-15d are paired, so that the two DC motors 15a and 15b are driven and controlled by a first circuit 18a and the other two DC motors 15c and 15d are driven and controlled by a second circuit 18b. The first circuit 18a is provided with first through third half-bridge circuits 19a, 19b, and 19c, and the second circuit 18b is provided with first through third half-bridge circuits 20a, 20b, and 20c.

Each of the half-bridge circuits 19a-19c, 20a-20c has a series circuit of n-channel power MOSFETs 21a and 21b, which are a pair of switching elements. Gate drive signals are provided to the power MOSFETs 21a and 21b from the control portion 17, so that, as will be described below, the power MOSFETs 21a and 21b pass a current to the DC motors 15a-15d. The DC motor 15a is connected between the half-bridge circuits 19a and 19b and driven to rotate in a forward direction (first operation direction) and a backward direction (second operation direction). The DC motor 15b is connected between the half-bridge circuits 19b and 19c and also driven to rotate in the forward direction (first operation direction) and the backward direction (second operation direction). The DC motors 15c and 15d are connected to the first through third half-bridge circuits 20a-20c in the same manner as above and driven to rotate by gate signals from the control portion 17.

Each of the DC motors 15a-15d is provided with a mechanism to detect a rotational position described below. The control portion 17 detects the rotational position for controlling the rotational driving, and controls the DC motor 15a-15d so that the rotational position coincides with the target position according to detection signals of the rotational positions from the respective DC motors 15a-15d.

In addition to the configuration as above, the motor drive circuit 16 includes a regulator 22 that supplies a power supply from an in-vehicle battery and a LIN (Local Interconnect Network) driver 24 that enables communications between the control portion 17 and an outside device such as an A/C-ECU 23 that controls the air conditioner. Owing to this configuration, the control portion 17 controls the driving of the DC motors 15a-15d in such a manner so as to achieve opening and closing states of the respective doors provided to the duct 2 as required from the A/C-ECU 23 via the LIN driver 24.

Figure 3:
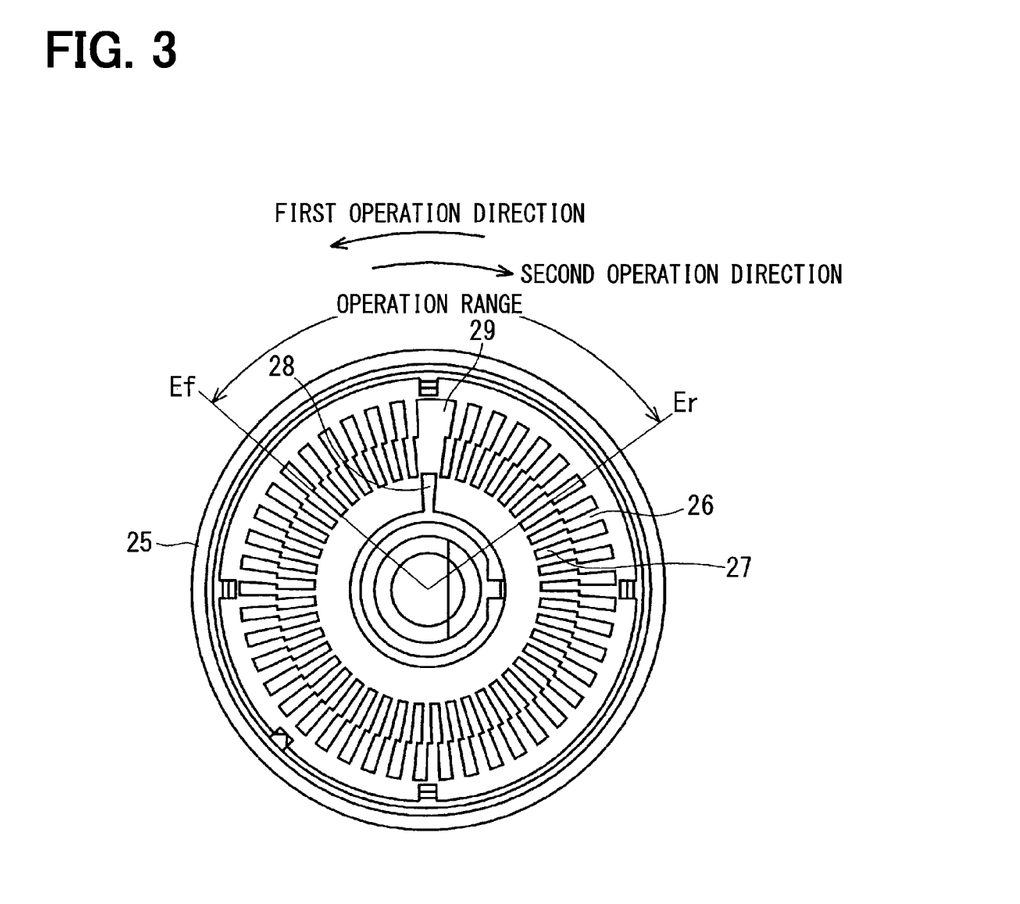
FIG. 3 is a plan view of a pulse pattern plate.

For a configuration to detect the rotational position of the DC motor 15a-15d or the rotational position of the door connected thereto via the link mechanisms, a pulse pattern plate 25 is used, as shown in FIG. 3, which rotates integrally with an output shaft of the DC motor 15a-15d in association with the rotation thereof. The pulse pattern plate 25 is provided with a first pulse pattern 26, a second pulse pattern 27, and a common pattern 28, each of which is formed of conductor pattern to detect a rotational direction and a rotational position, and which are aligned concentrically from an outer peripheral portion to a center. These patterns correspond to angle pattern.

In each of the first pulse pattern 26 and the second pulse pattern 27, conductor patterns at a predetermined angle are installed at predetermined angular intervals along a circumferential direction. Also, the first pulse pattern 26 and the second pulse pattern 27 are installed at positions at which the conductor patterns are displaced by a half pitch from each other, so that signals out of phase with each other can be obtained in a detection operation. Also, the common pattern 28 is provided with a conductor pattern at an origin position in the circumferential direction. A special origin position pattern 29 to detect the origin position is provided to the first pulse pattern 26 and the second pulse pattern 27 in regions that fall on the origin position. The origin position can be detected by detecting the origin position pattern 29 formed of the first and second pulse patterns 26 and 27 and the common pattern 28.

A drive device for the air conditioner is formed of the first through third half-bridge circuits 19a, 19b, and 19c, each of which having a pair of the switching elements 21a and 21b, the first DC motor 15a connected between the first and second half-bridge circuits 19a and 19b to drive the first door 4 of the air conditioner, the second DC motor 15b connected between the second and third half-bridge circuits 19b and 19c to drive the second door 12a, 13a, 14a, 12b, 13b, and 14b of the air conditioner, and the patterns 26, 27, and 28 and the origin position pattern 29 provided to detect the rotational positions of the respective first and second DC motors 15a and 15b.

The pulse pattern plate 25 configured as above is provided with, along a radius direction at a predetermined angle, a contact to detect the conductor pattern of the first pulse pattern 26, a contact to detect the conductor pattern of the second pulse pattern 27, and a contact to detect the conductor pattern of the common pattern 28. The origin position, the rotational direction, and the rotational angle are detected from a combination of the detection signals as to whether the respective conductor patterns are conducting or not.

When the rotational position of the DC motor 15a-15d is detected, the origin position pattern 29 is recognized first and then the rotational position is detected from the first and second pulse patterns 26 and 27. In this case, the origin position pattern 29 is detected through rotational movements in the first operation direction and the second operation direction within an operation range having a predetermined angle shown in FIG. 3 in a manner described below. The operation range has one end Ef (Ef1, Ef2) and the other end Er (Er1, Er2) provided so as to impose a mechanical movement limit on the rotational movements. The rotational movements are repeated several times between the both ends Ef and Er until the origin position pattern 29 is recognized.

The origin position pattern 29 is detected when data on the origin position is not stored, for example, when the power supply is turned ON for the first time in a fabrication sequence of the control unit for the air conditioner, or while in use due to battery replacement or a trouble. Once the origin position pattern 29 is recognized, the data on the recognized origin position is stored and thereafter the rotational position is detected according to the stored data on the origin position.

A function of the configuration described above will now be described with reference to FIG. 4 and FIG. 5. In this embodiment, a description of a normal air-conditioning control operation and rotational control of DC motors is omitted and a description will be chiefly given to an operation to detect the origin position which is necessary for rotational control on the DC motors 15a-15d.

In the configuration described above, the DC motors 15a-15d are formed as shown in FIG. 2. Hence, the pairs of the DC motors 15a and 15b use the common second half-bridge circuits 19b, and the pairs of the DC motors 15c and 15d use the common second half-bridge circuits 20b. When configured in this manner, while one DC motor in each pair is controlled to rotate in one direction, the other DC motor being controlled to rotate in the same direction is not allowed to change the rotational direction to the opposite direction.

When such a need arises, each pair is controlled to wait until either one of the DC motors stops rotating before the rotational direction of the other DC motor is changed. In this case, in order to prevent the user (driver) from feeling uncomfortable because the DC motor being driven stops an operation, the DC motor on the user recognizable side is preferentially controlled to rotate. For example, in the pair of the DC motors 15a and 15b, in order to perform the opening and closing control on the driver-seat and passenger-seat air outlets first and to switch the indoor and outdoor air inlets later, the DC motor 15b is preferentially controlled to rotate and the DC motor 15a is controlled to follow the DC motor 15b. In the pair of the DC motors 15c and 15d, in order to control the air mixing door 11a on the driver seat side first, the DC motor 15c is preferentially controlled to rotate.

On the contrary, in a detection operation of the origin position pattern 29, the driving is controlled as follows in order to suppress an increase in time resulting from using the priority order specified as above. In a detection operation of the origin position, as a general rule, each DC motor is controlled to rotate in the first operation direction. When the origin position pattern 29 is not detected, the DC motor is rotated further until the rotational position reaches an end Ef. Subsequently, the DC motor is controlled to rotate in the second operation direction by reversing the rotational direction and the detection operation is performed until the rotational position reaches the other end Er. Thereafter, the rotational control as above is repeated until the origin position is detected. However, the detection operation is stopped when the number of times the rotational direction is changed reaches a predetermined value on the ground that the detection operation is over the time limit.

The detection operation of the origin position pattern 29 of the DC motor 15a-15d by the control portion 17 will now be described with reference to FIG. 5. In order to detect the origin position pattern 29, the control portion 17 controls the respective pairs of the DC motors 15a and 15b and the DC motors 15c and 15d to rotate. In this case, the control portion 17 controls all of the DC motors 15a-15d to perform the detection operation according to the same program.

Firstly, the control portion 17 controls each DC motor to rotate in the first operation direction (A1) to detect the origin position pattern 29 by a sensor (A2). The control portion 17 ends the detection operation upon detection of the origin position pattern 29 (END). Otherwise, the control portion 17 repetitively performs Steps A1 through A3. When a rotation of the pulse pattern plate 25 stops such that a pulse to detect a rotational angle stops changing, it is determined that the rotational position of the DC motor reaches one end Ef without succeeding in detecting the origin position pattern 29 (A3).

Upon making a determination of YES at Step A3, the control portion 17 determines whether the other DC motor in the pair is stopping or allowed to be driven in the second operation direction at the same time (A4). If NO, the control portion 17 stays on standby in this state. If YES or the determination changes to YES during the standby, the control portion 17 controls the DC motor to rotate in the second operation direction by changing the rotational direction (A5). Thereafter, the control portion 17 performs the detection operation of the origin position pattern 29 through rotational movements in the second operation direction until the rotational position reaches the other end Er (A5 through A7) in the same manner as above. Thereafter, when a pulse change stops without detecting the origin position pattern 29, the control portion 17 determines that the rotational position reaches the other end Er (A7). The control portion 17 subsequently determines whether the other DC motor is stopping or allowed to be driven at the same time (A8). If NO, the control portion 17 stays on standby at this step.

Thereafter, when the determination at A8 changes to YES, the control portion 17 determines whether the number of times the operation direction is turned around reaches three (A9). If NO, the control portion 17 returns to A1 and controls the DC motor to rotate again in the first operation direction. If YES at A9, the control portion 17 determines that the detection operation of the origin position pattern 29 ends in failure and performs non-detection process (A10). The non-detection process is, for example, to notify a failure of the detection operation of the origin position pattern 29 by a display, a sound, or a voice speech, to transmit a detection failure situation via communications, or to take an action by determining another situation, such as a breakdown.

By controlling the driving of the DC motor 15a-15d according to the program described as above by the control portion 17, a maximum required time can be shortened. This effect solves an inconvenience as follows. That is, for example, in a case where it is set to control the driving of the DC motor 15b, 15c preferentially according to the priority order assigned as above, when the DC motor 15a or 15d on the non-priority side in the pair has a different operation range or requires a different time period required for movement, a considerably long time is required in some cases when the origin position cannot be recognized. For example, when such a situation occurs during the detection operation of the origin position at the manufacturing stage, a significantly long time is required as the maximum required time becomes longer in a case where a large number of products are manufactured.

Figure 4:
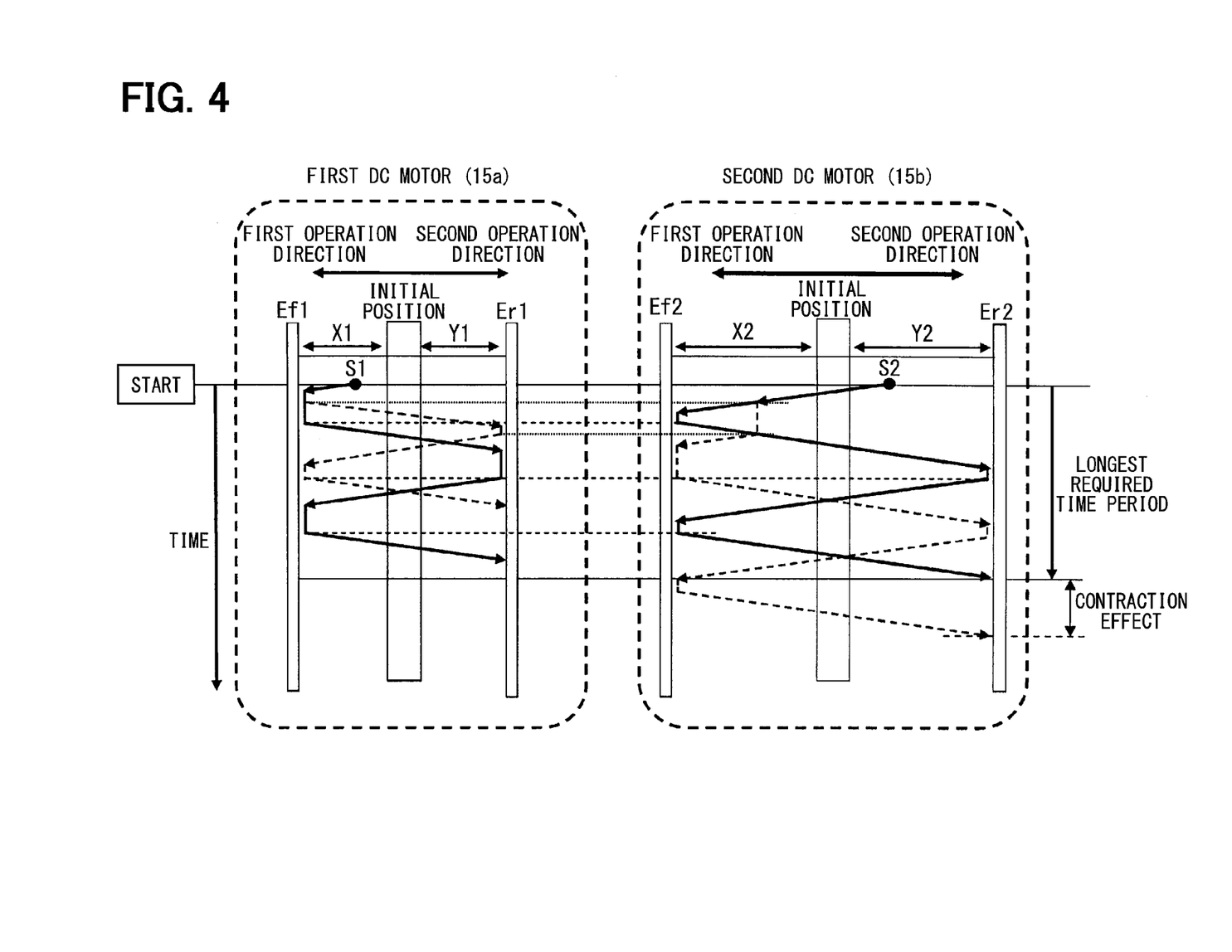
FIG. 4 is a view used to describe a function of an initial position pattern detection of a DC motor.
Figure 5:
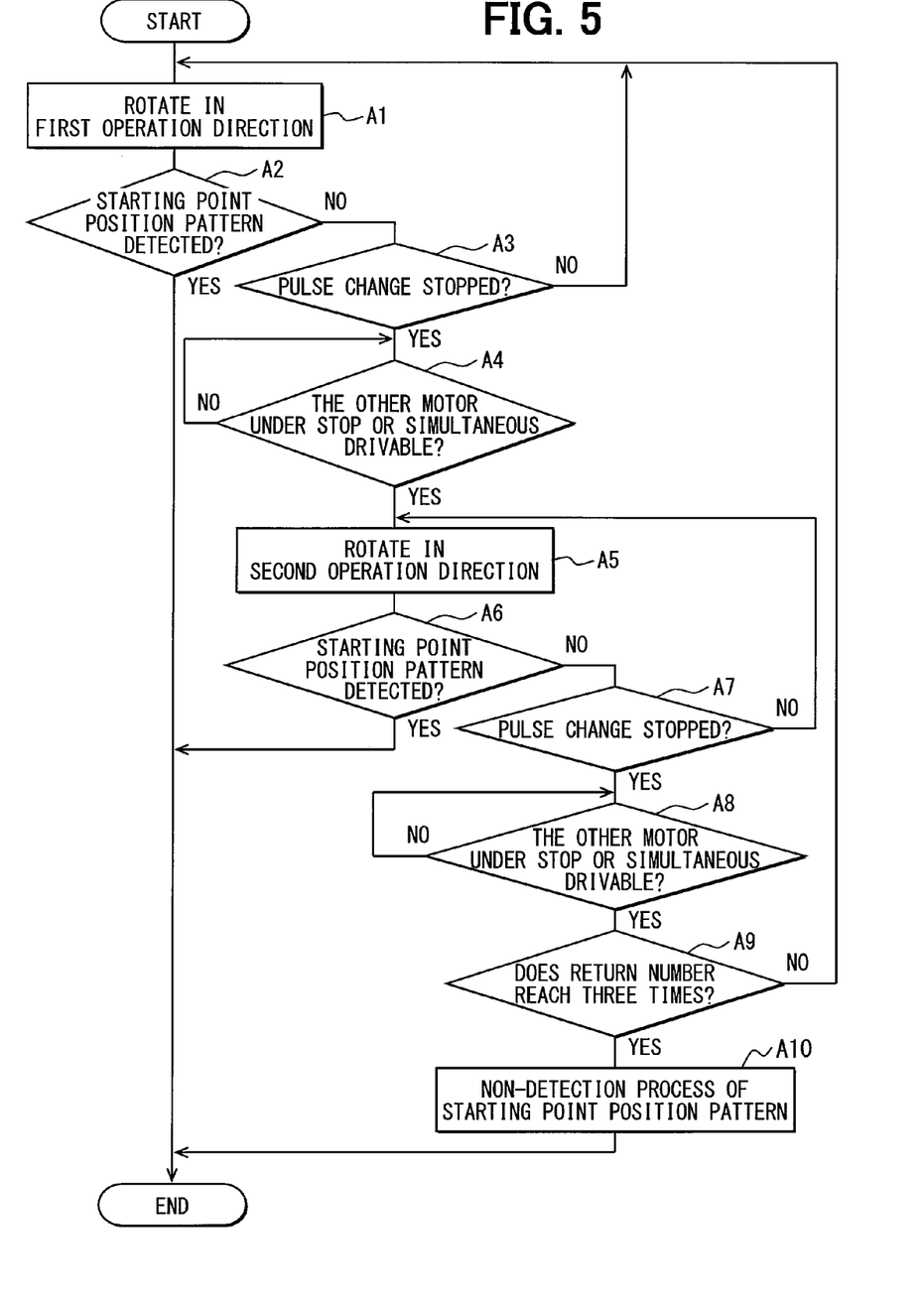
FIG. 5 is a flowchart depicting a content of control on the DC motor by the control unit.

To be more concrete, by controlling the DC motors 15a through 15d according to the program depicted in FIG. 5, operations shown in FIG. 4 can be achieved. In FIG. 4, movement positions of the DC motor 15a (first DC motor) and the DC motor 15b (second DC motor) indicated by solid lines represent operation of this embodiment capable of shortening the maximum required time, and movement positions indicated by broken lines represent an example corresponding to operation in a related art in which the maximum required time becomes long. For ease of description, assume that it is set in such a manner that the first DC motor 15a is operated preferentially in normal air-conditioning control.

In the detection operation of the origin position pattern 29, when the DC motor 15a is operated preferentially over the DC motor 15b as in the normal air-conditioning control, as is indicated by a broken line in the drawing, the maximum required time of the DC motor 15b is increased in a case where the detection of the origin position pattern 29 ends in failure. The reason for this increase is as follows. Assume that the DC motor 15a is at a position S1 when the detection is started. Then, the DC motor 15a is firstly controlled to rotate in the first operation direction and the rotational position moves to an end Ef1 without detecting the origin position. Here, the DC motor 15a is controlled preferentially. Hence, when it is determined that the DC motor 15a is stopping at the end Ef1 because it has been staying at the end Ef1 for a certain time, the rotational direction is changed to the second operation direction for the DC motor 15a to turn around. Thereafter, when the rotational position reaches the other end Er1 while the detection of the origin position pattern 29 is continued, the rotational direction is changed again to the first operation direction for the DC motor 15a to turn around. Thereafter, when the origin position pattern 29 is not detected, the operation of the DC motor 15a is controlled in the same manner as above until the turnaround operation is repeated a predetermined number of times.

On the other hand, assume that the DC motor 15b on the non-priority side is at a position S2 when the detection is started. Then, when the DC motor 15b is controlled to rotate in the first operation direction simultaneously with the DC motor 15a, the DC motor 15a is controlled to rotate in the second operation direction by the turnaround operation before the rotational position of the DC motor 15b reaches one end Ef2. In this instance, because the DC motor 15b can no longer move in the first rotational direction, the DC motor 15b stays in a stop state at the current position. When the rotational position of the DC motor 15a reaches the end Er1 and the DC motor 15a is rotated in the first operation direction by the turnaround operation, the DC motor 15b is also rotated again in the first rotational direction.

When the rotational position of the DC motor 15b reaches the one end Ef2 without detecting the origin position pattern 29, the DC motor 15b stays in a standby state this time because the DC motor 15a is still rotating in the first operation direction. In this manner, a time loss is generated in movement of the DC motor 15b by controlling the rotational driving of the DC motor 15a preferentially. Consequently, when the rotation control is performed without detecting the origin position pattern 29, the maximum required time is increased as indicted by a broken line.

A case of this embodiment indicated by solid lines in FIG. 4 will now be described. A description is given on the assumption that the positions S1 and S2 of the DC motors 15a and 15b, respectively, at the start of the detection are the same and the origin position pattern 29 is not detected even when the DC motors 15a and 15b are rotationally moved. In the detection operation of the origin position pattern 29, when the DC motors 15a and 15b are controlled to rotate in the first operation direction at the same time (A1), the DC motor 15a reaches the one end Ef1 earlier (YES at A3). Because the DC motor 15b is still moving in this instance, the DC motor 15a stays in a standby state at the end Ef1 (until the determination at A4 changes to YES) until the DC motor 15b reaches the one end Ef2 (until the determination at A3 changes to YES).

Thereafter, when the DC motor 15b reaches the one end Ef2 (YES at A3), the two DC motors 15a and 15b start a turnaround operation at the same time by changing the rotational directions to the second operation direction (A5). Thereafter, the DC motors 15a and 15b perform the turnaround operation in the same manner as above by waiting for the both DC motors 15a and 15b to reach the one ends Ef1 and Ef2, respectively (YES at A4) or to reach the other ends Er1 and Er2, respectively (YES at A8). When the turnaround operation is performed as many as three times, the detection operation is stopped and a notification is made to inform that the origin position pattern 29 is undetectable or an appropriate action is taken (A10: notification means). When configured in this manner, the maximum required time is not increased more than necessary and can be shorter than in a case where the DC motor to be driven preferentially is set.

According to this embodiment as above, when an operation to detect the origin position pattern 29 of each DC motor is performed by controlling the driving of the two DC motors 15a and 15b or the two DC motors 15c and 15d in the first circuit 18a or the second circuit 18b, respectively, the DC motors 15a through 15d are controlled in such a manner that when the rotational position of one DC motor in the pair reaches the end, the one DC motor waits until the rotational position of the other DC motor reaches the end before performing the turnaround operation by changing the rotational direction. Hence, in a case where the DC motors 15a through 15d having a difference of movement times to the end due to a difference of in the operation range and a difference in the operation time are combined, even when the detection operation is over the time limit because a detection of the origin position pattern 29 ends in failure and the turnaround operation is performed three times, the maximum required time can be shortened.

In a case where a detection operation of the origin position pattern 29 is performed for a large number of products at the stage of the fabrication sequence, even when a detection of the origin position pattern 29 ends in failure, a process capability can be improved by shortening the maximum required time.

During an operation as the air conditioner, the DC motor to be operated preferentially is set in the respective pairs of the DC motors 15a and 15b and the DC motors 15c and 15d. Hence, in a case where the DC motors in the respective pairs are driven to rotate at the same time when an air-conditioning operation is controlled by the configuration to control the driving of two DC motors using three half-bridge circuits, the DC motors can be operated without making the user (driver) feel uncomfortable.

Second Embodiment

Figure 6:
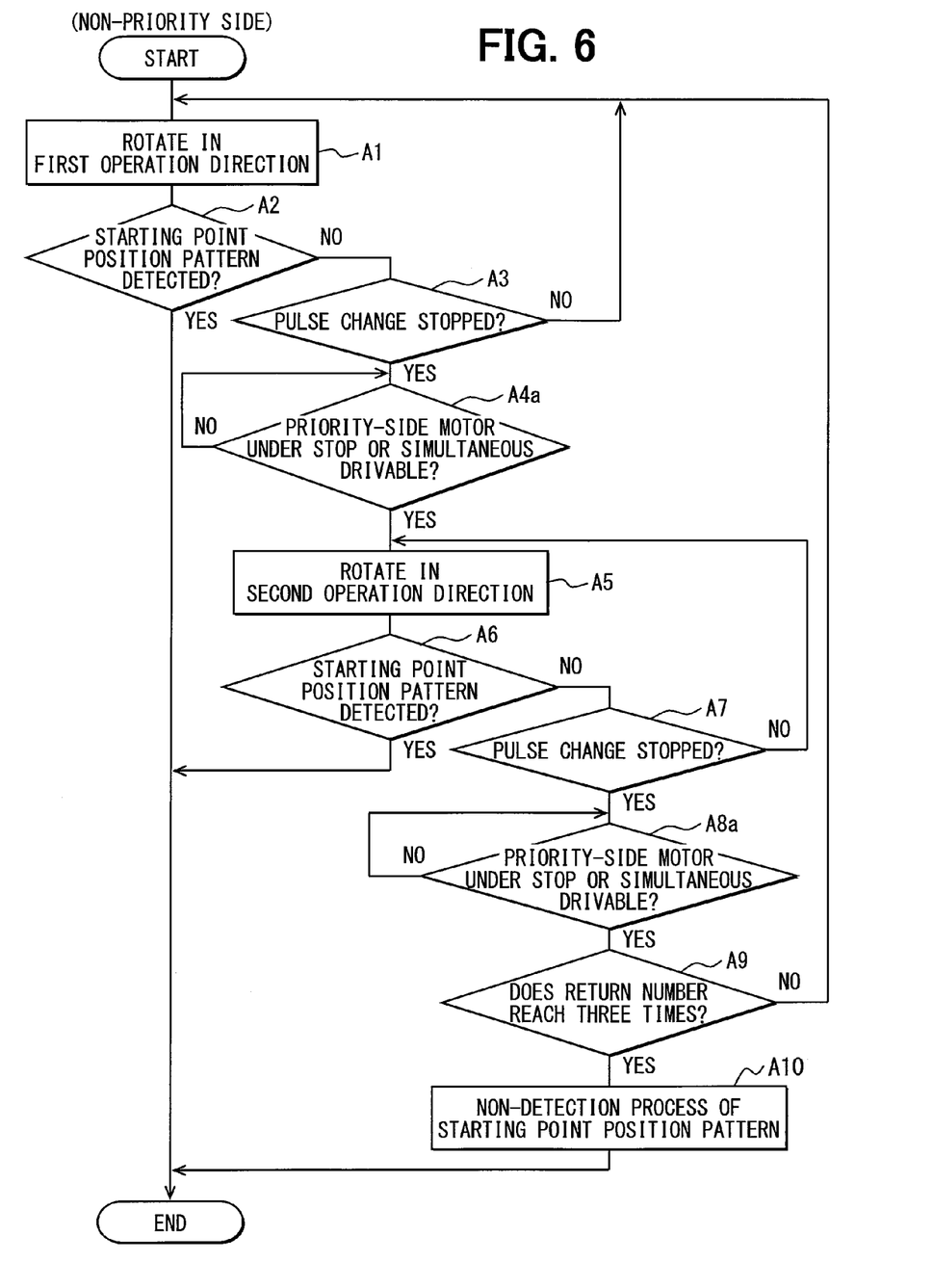
FIG. 6 is a flowchart depicting a content of control on a DC motor on a non-priority side by a control unit according to a second embodiment.
Figure 7:
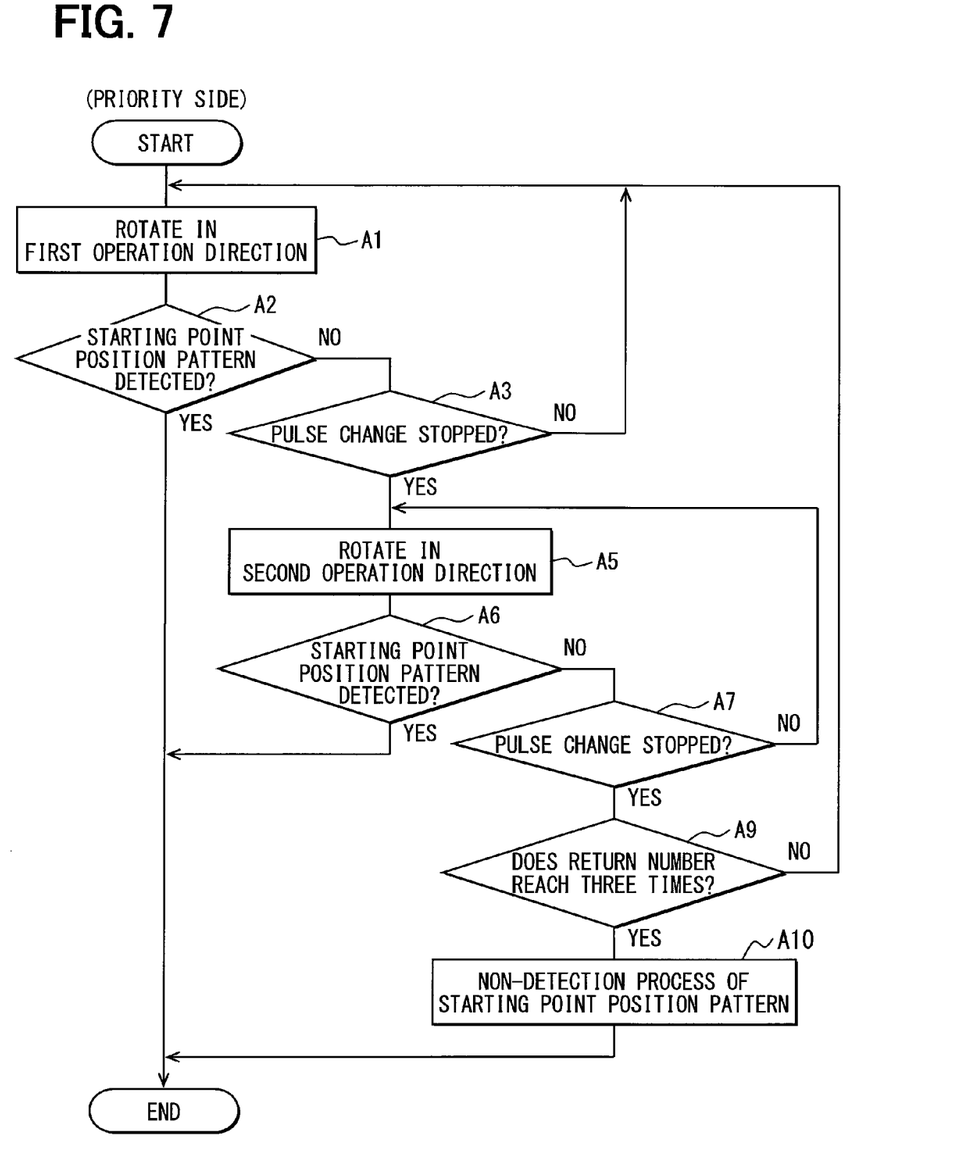
FIG. 7 is a flowchart depicting a content of control on a DC motor on a priority side by the control unit of the second embodiment.

FIG. 6 and FIG. 7 show a second embodiment. Hereinafter, a different portion from the first embodiment above will be described. In this embodiment, when a detection operation of an origin position pattern 29 is performed, driving of DC motors is controlled by separately setting a DC motor to be operated preferentially.

The first embodiment above adopts the drive control method, by which, of the DC motors 15a and 15b and the DC motors 15c and 15d in the respective pairs, the DC motors 15a and 15c are set on a priority side and operated in normal air conditioning control, whereas a priority is not set in a detection operation of the origin position pattern 29.

In contrast to this configuration, the second embodiment is configured to set a DC motor to be operated preferentially in a detection operation of the origin position pattern 29 separately from the one set in the air conditioning operation. In this case, the DC motor to be operated preferentially is set, for example, to the one that takes the longer time to move between one end and the other end.

For example, in the second embodiment, the DC motor 15*b* is set on a priority side and the DC motor 15*a* is set on a non-priority side. A flowchart depicted in FIG. 6 is used to control the DC motor on the non-priority side, that is, the DC motor 15*a*. A flowchart depicted in FIG. 7 is used to control the DC motor on the priority side, that is, the DC motor 15*b*.

In the detection operation of the origin position pattern 29, the control portion 17 drives the DC motor 15*a* on the non-priority side according to the flowchart of FIG. 6. A program depicted by the flowchart of FIG. 6 has a content substantially the same as the content depicted by the flowchart of FIG. 5 in the first embodiment above. Because the priority side and the non-priority side are set here, expressions at A4*a* and A8*a* are changed to the DC motor 15*b* on the priority side.

Hence, when the rotational position of the DC motor 15*a* on the non-priority side reaches an end Ef1 or Er1 without detecting the origin position pattern 29 (YES at A3 and A7), the control portion 17 determines whether the DC motor 15*b* on the priority side is stopping or allowed to be driven at the same time (Aa4 and A8*a*). The DC motor 15*a* then performs a turnaround operation by changing the rotational direction (A5 and A1). Because the DC motor 15*a* reaches the end Ef1 or Er1 in a short time, the maximum required time can be shortened by controlling the DC motor 15*a* in association with an operation of the DC motor 15*b* on the priority side.

On the other hand, the control portion 17 drives the DC motor 15*b* on the priority side according to the flowchart of FIG. 7 in the detection operation of the origin position pattern 29. The program depicted by the flowchart of FIG. 7 is run according to the content of the flowchart of FIG. 6 by omitting Steps A4*a* and A8*a*.

Hence, when the rotational position of the DC motor 15*b* on the priority side reaches an end Ef2 or Er2 without detecting the origin position pattern 29 (YES at A3 and A7), the DC motor 15*b* performs a turnaround operation by changing the operation direction independently of an operation of the DC motor 15*a* on the non-priority side (A5 and A1). Because the DC motor 15*b* takes a longer time to move between the ends Ef2 and Er2 than the DC motor 15*a*, the maximum required time can be shortened by operating the DC motor 15*b* preferentially over the DC motor 15*a*.

Other Embodiment

It should be appreciated that the present disclosure is not limited to the embodiments described above and can be implemented in various embodiments within the scope and sprit of the present disclosure. For example, the present disclosure can be modified or extended as follows.

When a time-out of the detection operation of the origin position pattern is determined at Step A9, the number of times the turnaround operation is performed is set to three. It should be appreciated, however, that the number of times can be changed to suit situations, such as an operation time and environments. For example, the number of times can be set to two, or greater than or equal to four. Also, counting means may be means that makes a detection by software or may be a configuration that takes a count by hardware.

Combinations in the pairs of the DC motors 15*a* through 15*d* in the first circuit 18*a* and the second circuit 18*b* can be changed.

The switching elements are not limited to the n-channel MOSFETs 21*a* and 21*b* and can be IGBTs or bipolar transistors instead.

It may be configured in such a manner that the rotational positions of the DC motors are detected by means other than the pulse pattern plate 25. It is sufficient to provide a configuration capable of detecting an origin position, a rotational direction, and an amount of rotation.

Step A10 is provided in the flowchart as the notification means. However, a notification operation can be performed by providing display means of performing a notification operation or a device outputting a notification sound or a notification speech, or by transmitting information on the notification to another device by communication means.

The embodiments above have described a case where the switching control on the air outlets is performed. It should be appreciated, however, that the present disclosure may be of another configuration or perform another type of control. Even in such a case, the control of the embodiments above is applicable by adopting the configuration to control the driving of two DC motors by three half-bridge circuits.

What is claimed is:

1. A control unit for an air conditioner comprising:
   first, second, and third half-bridge circuits, each of which having a pair of switching elements;
   a first DC motor connected between the first and second half-bridge circuits to drive a first door of the air conditioner;
   a second DC motor connected between the second and third half-bridge circuits to drive a second door of the air conditioner;
   angle patterns and an origin position pattern provided to each of the first and second DC motors to detect a rotational position thereof; and
   a controller that controls driving of the first and second DC motors by detecting the rotational position thereof from the angle patterns in reference to the origin position pattern, wherein
   as a detection operation of the origin position pattern of each of the first and second DC motors,
   the controller performs a detection of the origin position pattern by controlling each DC motor to rotate toward one side within a detectable range and to stop upon detection of the origin position pattern, and
   in case where the rotational position reaches one end of the detectable range, the controller performs a detection of the origin position pattern by controlling the DC motor to rotate oppositely from the one side when the other DC motor is stopping, and the controller performs a detection of the origin position pattern by controlling the DC motor to rotate oppositely from the one side after the rotational position of the other DC motor reaches the one end of the detectable range when the other DC motor is rotating.

2. The control unit for an air conditioner according to claim 1,
   wherein
   the controller performs the detection control of the origin position pattern for both of the first and second DC motors under a same condition.

3. The control unit for an air conditioner according to claim 1, wherein the controller performs the detection control of the origin position pattern for one of the first and second DC motors specified in advance, and for the other one not specified, the controller performs a detection of the origin position pattern by controlling the other one to rotate toward the one side within the detectable range and to stop upon detection of the origin position pattern, and when the rotational position reaches one end of the detectable range, the controller performs a detection of the origin position pattern by controlling the other one to rotate oppositely from the one side.

4. The control unit for an air conditioner according to claim 1, wherein when the controller performs detection control of the origin position pattern, the controller controls driving of the first and second DC motors by counting the number of times each DC motor is rotated oppositely after the rotational position reaches one end within the detectable range, and stops an operation of the detection control of the origin position pattern when the count value reaches a predetermined number of times.

5. The control unit for an air conditioner according to claim 4, the control unit further comprising:

notification means, wherein when the controller stops the operation of the detection control of the origin position pattern, the controller controls the notification means to make a notification informing that the origin position pattern is undetectable.

6. A control unit for an air conditioner used for a drive device for the air conditioner, the drive device including first, second, and third half-bridge circuits, each of which having a pair of switching elements, a first DC motor connected between the first and second half-bridge circuits to drive a first door of the air conditioner, a second DC motor connected between the second and third half-bridge circuits to drive a second door of the air conditioner, and angle patterns and an origin position pattern provided to each of the first and second DC motors to detect a rotational position thereof, wherein the control unit for an air conditioner controls driving of the first and second DC motors by detecting a rotational position of each DC motor from the angle patterns in reference to the origin position pattern, the control unit comprising:

first control means that detects the origin position pattern by controlling each DC motor to rotate toward one side within a detectable range and to stop upon detection of the origin position pattern; and second control means, in case where the rotational position reaches one end of the detectable range, that perform a detection of the origin position pattern by controlling the DC motor to rotate oppositely from the one side when the other DC motor is stopping, and that performs a detection of the origin position pattern by controlling the DC motor to rotate oppositely from the one side after the rotational position of the other DC motor reaches the one end of the detectable range when the other DC motor is rotating.

* * * * *